United States Patent [19]

Fiorucci et al.

[11] Patent Number: 4,517,164

[45] Date of Patent: May 14, 1985

[54] PURIFICATION OF ALKALI METAL NITRATES

[75] Inventors: Louis C. Fiorucci, Hamden, Conn.; Kevin M. Gregory, Woodridge, Ill.

[73] Assignee: Olin Corporation, Cheshire, Conn.

[21] Appl. No.: 613,666

[22] Filed: May 24, 1984

[51] Int. Cl.³ ............................................. C01F 11/36
[52] U.S. Cl. ..................................... 423/184; 423/198
[58] Field of Search ................. 423/55, 140, 144, 184, 423/194, 198, 395, 192

[56] References Cited

U.S. PATENT DOCUMENTS 2,375,759  5/1945  Kalichevsky et al. ................ 252/71

FOREIGN PATENT DOCUMENTS 7768860  6/1977  Japan .
545590   6/1942  United Kingdom .

OTHER PUBLICATIONS

Fiorucci et al., "Manufacture, Distribution, and Handling of Nitrate Salts for Solar Thermal Applications", Contract Report SAND81-8186, 11/1982, pp. 93-94.

Primary Examiner—Gregory A. Heller
Assistant Examiner—Wayne A. Langel
Attorney, Agent, or Firm—Donald F. Clements; James B. Haglind

[57] ABSTRACT

A process is disclosed for removing heavy metal contaminants from impure alkali metal nitrates containing them. The process comprises mixing the impure nitrates with sufficient water to form a concentrated aqueous solution of the impure nitrates, adjusting the pH of the resulting solution to within the range of between about 2 and about 7, adding sufficient reducing agent to react with heavy metal contaminants within said solution, adjusting the pH of the solution containing reducing agent to effect precipitation of heavy metal impurities and separating the solid impurities from the resulting purified aqueous solution of alkali metal nitrates. The resulting purified solution of alkali metal nitrates may be heated to evaporate water therefrom to produce purified molten alkali metal nitrate suitable for use as a heat transfer medium. If desired, the purified molten form may be granulated and cooled to form discrete solid particles of alkali metal nitrates.

14 Claims, No Drawings

PURIFICATION OF ALKALI METAL NITRATES

The Government has rights in this invention pursuant to Contract No. Sandia 84-3878 awarded by the U.S. Department of Energy.

This invention relates to the purification of alkali metal nitrates. More particularly, it is directed to the removal of heavy metal contaminants from a mixed alkali metal nitrate heat transfer medium.

The energy crisis has generated the investigation of a large number of alternate sources of power. One technique presently under investigation is the use of solar energy to raise the temperature of a suitable heat transfer medium and convey the heat transfer medium to a suitable steam generator or to a heating system for an inhabited dwelling. One heat transfer medium under intensive investigation at this time is the eutectic mixture of sodium nitrate and potassium nitrate. This mixture may contain from about 30 to about 70 percent by weight of sodium nitrate and between about 30 and about 70 percent by weight of potassium nitrate. This mixture has a relatively low melting point, which is about 400° F., and has a relatively low viscosity in the molten state. As a result, it can be easily transferred by pumping or otherwise within a closed system.

Although sodium nitrate and potassium nitrate are relatively inexpensive chemicals, there are frequently heavy metal contaminants in the form of carbonates, oxides and sulfates. In addition, when the molten form of the mixed nitrate is circulated in the solar power system or industrial process heat systems, small quantities of heavy metal impurities may be dissolved from the materials of construction used as conduits, storage tanks and the like. In addition, local hot spots in the solar energy system may cause degradation of the alkali metal nitrates to form oxides, oxygen and nitrogen. The oxides may react with water and carbon dioxide to form hydroxides and carbonates.

There is a need at the present time to provide a process for reducing the heavy metal contaminants found in alkali metal nitrates, particularly those used in the preparation of solar energy heat transfer medium.

It is a primary object of this invention to provide an improved process for purifying alkali metal nitrates.

It is another object of this invention to provide a process for reducing the concentration of heavy metal impurities found in alkali metal nitrates.

Still another object of the invention is to provide a process for purifying mixed alkali metal nitrates utilized as a heat transfer medium in solar energy systems and industrial process heat systems.

A further object of the invention is to provide a process for purifying eutectic mixtures of sodium nitrate and potassium nitrate.

These and other objects of the invention will be apparent from the following detailed description thereof.

It has now been discovered that the foregoing objects are accomplished in a process for removing heavy metal contaminants from impure alkali metal nitrates containing them, which comprises:

a. admixing the impure alkali metal nitrates with sufficient water to form a concentrated aqueous solution thereof;

b. adjusting the pH of the concentrated aqueous solution to within a range from between about 2 to about 7;

c. adding sufficient reducing agent to said concentrated aqueous solution to reduce heavy metal contaminants contained therein;

d. adjusting the pH of the concentrated aqueous solution containing reducing agent to a pH of at least about 6 to effect precipitation of solid heavy metal contaminants within said concentrated aqueous solution; and e. separating said solid heavy metal contaminants from the resulting purified solution of alkali metal nitrate.

More in detail, any alkali metal nitrate containing heavy metal impurities may be purified by the process of this invention. Typical examples of alklai metal nitrates include sodium nitrate, potassium nitrate, and lithium nitrate, or mixtures thereof. The process of this invention is particularly effective when treating a solar or industrial heat transfer medium comprised of a mixture of sodium nitrate and potassium nitrate, wherein the sodium nitrate concentration is about 60 percent by weight and the potassium nitrate concentration is about 40 percent by weight. However, the concentrations of sodium nitrate and potassium nitrate may range from about 30 to about 70 percent by weight of the mixture.

The process of this invention may be utilized in the purification of alkali metal nitrates in solid or molten form. For example, sodium nitrate solids obtained by conventional mining and beneficiating techniques, which contain heavy metal contaminants in the range of from about 0.03 to about 0.15 percent by weight may be processed in accordance with the process of this invention. In addition, the process of this invention is useful in the purification of impure mixed nitrates produced synthetically or impure mixed nitrates obtained from solar heat systems, which contain metal impurities within the range from about 0.03 to about 0.5 percent by weight. The impure alkali metal nitrates are dissolved in sufficient water to form a concentrated aqueous solution of the alkali metal nitrate having a concentration within the range of from between about 20 to about 70 and preferably between about 30 and about 50 percent of alkali metal nitrate by weight. Either solid or molten forms of the alkali metal nitrates may be added to the water.

Sufficient acid is added to the concentrated aqueous alkali metal nitrate solution to adjust the pH thereof to within the range of from about 2 to about 7 and preferably from about 2 to about 5. Any suitable acidic substance which is nonreactive with the alkali metal nitrates may be utilized for this purpose. It is preferred to utilize nitric acid since it does not add any foreign anion to the alkali metal nitrate being treated. However, if anionic impurity is not a problem, then any other suitable acid such as sulfuric acid, hydrochloric acid, phosphoric acid and the like may be employed. It is preferred to employ a concentrated mineral acid when adjusting the pH in order to minimize the amount of water that may ultimately have to be evaporated to obtain the desired purified molten product. However, any suitable concentration of acids may be utilized.

After the pH of the concentrated aqueous solution of alkali metal nitrate has been adjusted to the desired level, sufficient reducing agent is added to the concentrated aqueous solution to react with heavy metal impurities present. Sufficient reducing agent is added to the concentrated aqueous solution to provide at least the stoichiometric amount, and preferably between about 1.5 and about 2.0 times the stoichiometric proportion necessary to reduce all of the heavy metal contaminants to a reduced valent state. Typical examples of suitable reducing agents include alkali metal sulfides, alkali metal bisulfites, alkali metal borohydrides and hydrazine. Sodium bisulfite is preferred for use as the reducing agent, but other sodium and potassium compounds such as sodium bisulfite, sodium sulfide, sodium borohydride and the like having reducing properties may also be employed.

The reducing agent is added to the lower pH concentrated aqueous solution of alkali metal nitrate in the form of a concentrated aqueous solution in order to minimize the amount of water ultimately evaporated from the alkali metal nitrate. Generally the concentration of the reducing agent in the aqueous solution is in the range of between about 0.2 and about 2.0 and preferably from about 0.35 to about 1.3 percent by weight.

In order to effect precipitation of the heavy metal impurities, a basic material is added to the aqueous concentrated solution of alkali metal nitrate in a proportion sufficient to increase the pH of the solution above about 6, generally between about 6 and about 9, and preferably between about 7 and about 8. In the event the reduced solution is already above about 6, sufficient basic material is added to raise the pH above about 7 and within the above recited ranges. A basic material such as alkali metal hydroxide, including sodium hydroxide and potassium hydroxide, is preferably used to adjust the pH because these bases do not add interfering ions to the alkali metal nitrate component. However, other basic materials such as calcium hydroxide and calcium oxide may also be used, if desired. The base is added as an aqueous solution having a base concentration in the range between about 10 and about 70, and preferably between about 30 and about 50 percent by weight. It is preferred to add more concentrated solutions of the basic material in order to eliminate the need for evaporating water from the purified alkali metal nitrate solution.

Addition of the aqueous base at the above pH levels and in the above proportions effects precipitations of the heavy metal impurities within the aqueous alkali metal nitrate solution.

After the impurities have been precipitated, they are separated from the resulting purified aqueous solution of alkali metal nitrate by any conventional solid-liquid separation technique such as filtration, centrifuge, decanting, and the like. If desired, the separated precipitate may be washed with water to remove any alkali metal nitrate values contained in the solid precipitate. The wash water containing dissolved nitrates may be used to dissolve impure alkali metal nitrate as described above.

The solid impurities are collected and may be discharged to a suitable waste area or landfill. The purified aqueous alkali metal nitrate solution may be heated to evaporate water therefrom, if desired, to form a molten form of the alkali metal nitrate. As indicated above, a eutectic mixture of sodium nitrate and potassium nitrate is a preferred ingredient for purifying in accordance with the process of this invention.

When admixing the impure aqueous alkali metal nitrate solution with the above-mentioned acid, reducing agent, and base, to effect the pH lowering, addition of the reducing agent, and the pH raising, respectively, suitable agitation means are employed. Frequently, when the base is added to precipitate the heavy metal impurities, a porous floc-type precipitate forms. It is important that mild agitation be used at this point in order to prevent breaking up the precipitate into finely divided particles, since the floc-type preciptate is generally easier to separate by filtration or centrifuging.

The temperature of the alkali metal nitrate solution is maintained in the range between about 25° and about 85° C. during the period that acid, reducing agent, and base are added thereto. Higher or lower temperatures may be employed, if desired, in order to optimize the reduction and precipitation reactions.

Heavy metal impurities which are separated from the aqueous alkali metal nitrate solution as solid precipitate in accordance with the process of this invention, include heavy metals such as chromium, nickel, molybdenum, iron and copper. These compounds may be in the form of nitrates, nitrites, carbonates, hydroxides, and oxides. When sodium bisulfite is used as the reducing agent, sulfur may also precipitate along with the impurities during the process. As a result, it is possible to purify the aqueous solution of alkali metal nitrate without adding any foreign substances to the solution. Since many of the impurities are obtained by contact of the alkali metal nitrate in molten form with materials of construction in the solar energy system, there is a need to control these foreign impurity components as much as possible. Purification of a bleed stream from the solar energy system or the individual components of the heat transfer medium can be accomplished with the process of this invention, thus eliminating the need for a complete plant shutdown to effect treatment.

The following examples are presented in order to define the invention more fully without any intention of limiting the invention. All parts and percentages are by weight unless otherwise specified.

EXAMPLE 1

Sodium Sulfide

50 Grams of a mixture of sodium nitrate and potassium nitrate (60:40) were mixed with sufficient chromium trioxide to provide 267 parts per million of total chromium. The resulting solid mixture was dissolved in sufficient water to form an aqueous solution containing about 40 percent of the mixed nitrates. The pH of the resulting aqueous solution was adjusted to 3.0 with about 2.0 grams of sulfuric acid having a concentration of 10 percent. About 0.9 grams of sodium sulfide in solid form was dissolved in the aqueous solution. About 4.0 ml of sodium hydroxide having a concentration of about 10 percent were added to adjust the pH of the aqueous solution containing sodium sulfide to about 7.5. As the pH increased, solid precipitate formed in the aqueous solution which was found to be chromium hydroxide. Some hydrogen sulfide gas was discharged from the mixture during the reaction. The solids were separated by filtration and discarded. The resulting aqueous solution of sodium nitrate and potassium nitrate contained 16 parts per million of trivalent chromium and less than 5 parts per million of hexavalent chromium. The concentration of alkali metal nitrates in the solution was about 35 percent.

EXAMPLE 2

Sodium Bisulfite

200 Grams of a mixture of sodium nitrate and potassium nitrate (60:40) in solid form were admixed with chromium trioxide in a proportion sufficient to provide a total chromium ion concentration in the mixture of about 1000 parts per million. This solid mixture was dissolved in about 300 grams of water to provide an aqueous solution of the nitrates and chromium oxides having a concentration of about 40 percent alkali metal nitrate. Sulfuric acid (2.0 ml having a concentration of about 10 percent) was added to adjust the pH of the resulting solution to about 3.5. To this solution was added one gram sodium bisulfite, followed by the addition of about 5.0 ml of sodium hydroxide to raise the pH of the reduced solution to about 7.5. The resulting solid precipitate was separated by filtration from the aqueous alkali metal nitrate solution. The clarified filtrate was analyzed for chromium level and was found to contain a total chromium concentration of less than 20 parts per million and a hexavalent chromium concentration of less than 5 parts per million.

EXAMPLE 3

Hydrazine

50 Grams of a mixture of sodium nitrate and potassium nitrate (60:40) in solid granular form were admixed with chromium trioxide in a proportion sufficient to provide a total chromium ion concentration in the mixture of about 895 parts per million. This mixture was dissolved in water to provide an aqueous solution of alkali metal nitrates having a concentration of about 25 percent by weight. To the resulting aqueous solution was added 0.72 gram of hydrazine. The pH of the solution was almost about 6.0. After reduction of the chromium ions from the six valence to the three valence, sufficient sodium hydroxide (about 1.0 ml of 0.5 percent by weight sodium hydroxide) was added to the reduced solution to adjust the pH to about 7.5.

The resulting solid precipitate was separated by filtration from the aqueous solution of sodium nitrate and potassium nitrate. The clarified filtrate was analyzed for chromium level and was found to contain a total chromium concentration of 241 parts per million and a hexavalent chromium concentration of about 5 parts per million.

EXAMPLES 4-14

Sodium Bisulfite

An aqueous solution of a mixture of sodium nitrate and potassium nitrate containing 40 percent of the mixture by weight was prepared. Eleven portions of this solution, each portion being in the amount of 100 milliliters were collected for use in carrying out Examples 4-14. In each example, a proportion of potassium chromate was dissolved in the aqueous solution in an amount sufficient to provide the chromium +6 anion in a concentration indicated below in Table 1. Where indicated, sufficient iron and nickel were added as ferric chloride and nickel chloride, respectively, in order to provide the iron and nickel concentrations set forth below in the table.

The pH was maintained with nitric acid and the temperature of each example were maintained at the level indicated below in the table and sufficient sodium bisulfite was then added to each example in the amounts indicated. After the specified reaction time, the pH was adjusted with sodium hydroxide, if necessary, to raise the pH to the indicated level. After the specified precipitation time, the resulting slurry was then filtered on either a fine, coarse or medium filter. The fine filter retained everything above 5 microns in diameter, the medium filter retained everything above 10 microns in diameter and the coarse filter retained everything above 40 microns in diameter.

When a coarse filter was employed, the solid particles remaining in the filtrate were separated on a medium filter and the clarified filtrate and the solids were then analyzed to determine a material balance for the chromium, iron, and nickel impurities. The percent removal of impurities from the initial alkali metal nitrate solutions is set forth below in Table 1.

In Example 12, the initial alkali metal concentration was 20 percent, rather than 40 percent in the remaining examples.

TABLE 1

Mixed Nitrate Salts - Statistical Screening Trials for Bisulfite Reduction of $Cr^{6+}$

| Example | Temp °C. | pH | $Cr^{6+}$ ug/ml | $NaHSO_3$ g/100 ml | $Fe^{3+}$ ug/ml | $Ni^{2+}$ ug/ml | ppt Time min. | Filt. Temp. °C. | Filt. Poros. C,M,F | React. Time min. | Fe ppt. ug/ml | Fe Filt. ug/ml | Fe med filt. ug/ml | Fe Removed % |
|---|---|---|---|---|---|---|---|---|---|---|---|---|---|---|
| 4  | 85 | 7   | 61  | 1.289  | 646 | 834  | 7  | 25 | F | 30 | 700 | .75 | —   | 99.9 |
| 5  | 85 | 2   | 716 | 1.261  | 0   | 0    | 5  | 25 | C | 5  | —   | —   | —   | —    |
| 6  | 85 | 2   | 78  | 1.2506 | 0   | 0    | 20 | 25 | F | 50 | —   | —   | —   | —    |
| 7  | 25 | 2   | 97  | 0.2445 | 605 | 554  | 20 | 25 | C | 30 | 5   | 495 | 480 | .9   |
| 8  | 25 | 7   | 80  | 1.243  | 0   | 0    | 20 | 85 | C | 5  | —   | —   | —   | —    |
| 9  | 85 | 2   | 685 | 0.2566 | 617 | 1088 | 20 | 85 | F | 5  | 550 | 1   | —   | 99.8 |
| 10 | 85 | 2   | 570 | 1.280  | 0   | 0    | 5  | 25 | C | 30 | —   | —   | —   | —    |
| 11 | 85 | 7   | 591 | 1.3234 | 593 | 553  | 20 | 85 | C | 30 | 30  | 601 | 630 | 5    |
| 12 | 55 | 4.5 | 458 | 0.7326 | 378 | 283  | 12 | 55 | M | 17 | 400 | 1.5 | —   | 99.6 |
| 13 | 85 | 4.5 | 659 | 0.3568 | 594 | 620  | 15 | 85 | C | 17 | 75  | 501 | 575 | 13   |
| 14 | 85 | 4.5 | 7   | .3517  | 594 | 527  | 15 | 85 | C | 17 | 33  | 501 | 533 | 6    |

| Example | Fe Removed med filt | Ni ppt. ug/ml | Ni Filt. ug/ml | Ni med filt ug/ml | Ni Removed % | Ni Removed med filt | Cr ppt ug/ml | Cr Filtr. ug/ml | Cr Filtrate med filt. | Cr Removed % | Cr Removed med filt. |
|---|---|---|---|---|---|---|---|---|---|---|---|
| 4  | 99.9 | 800  | 9.3  | —     | 98.9 | 98.9 | 75  | 3.5 | —   | 95.6  | 95.6 |
| 5  | —    | —    | —    | —     | —    | —    | 2.8 | 858 | 828 | .3    | 96.2 |
| 6  | —    | —    | —    | —     | —    | —    | 100 | 1.3 | —   | 98.8  | 98.8 |
| 7  | 96   | 2    | 540  | 477   | .4   | 88   | .8  | 103 | 101 | .7    | 97.6 |
| 8  | —    | —    | —    | —     | —    | —    | .5  | 45  | 26  | 1.1   | 56   |
| 9  | 99.8 | 875  | 2.3  | —     | 99.7 | 99.7 | 725 | 4   | —   | 95.5  | 99.5 |
| 10 | —    | —    | —    | —     | —    | —    | 2.3 | 653 | 652 | .3    | 99.5 |
| 11 | 99.8 | 27.5 | 503  | 527.5 | 5    | 99.5 | 225 | 555 | 775 | ˙28.9 | 99.4 |
| 12 | 99.6 | 225  | 10.5 | —     | 95.5 | 95.5 | 450 | 7   | —   | 98.5  | 98.5 |
| 13 | 99.8 | 68   | 455  | 518   | 8.7  | 99.4 | 108 | 654 | 758 | 14.1  | 99.5 |

TABLE 1-continued

Mixed Nitrate Salts - Statistical Screening
Trials for Bisulfite Reduction of $Cr^{6+}$

| 14 | 99.8 | 28 | 528 | 533 | 5 | 99.5 | 2.5 | 28 | 27.5 | 35.1 | 89.2 |

EXAMPLE 15

Sodium Bisulfite

To 40 ml of a 40 percent weight solution of solar nitrate salt was added 0.1492 g $K_2CrO_4$, the pH was adjusted to 3.98 at ambient temperature (24° C.), and 0.165 g $NaHSO_3$ was added. The pH instantly rose to 5.52. The resulting solution was stirred five minutes and then 0.0194 g $Ca(OH)_2$ was added to raise the pH to 7.8. The solution was stirred for five minutes and left to sit to let the precipitate settle out. The blue-green precipitate was filtered through a fine porosity glass fritted Buchner funnel, collected, and oven dried overnight to give 0.110 grams of dried precipitate. The yellow filtrate was analyzed for total Cr by atomic absorption methods and showed 114 ppm Cr which represents [(973-114)/973×100] 88.3% removal of $Cr^{6+}$.

EXAMPLE 16

Sodium Bisulfite

In this example, the same procedure was followed as in Example 15 except that 0.0582 grams $CuSO_4$ (anhydrous) was added before the $NaHSO_3$ was added. The other amounts used were 0.1504 g $K_2CrO_4$, 0.1609 g $NaHSO_3$, 0.0988 g $Ca(OH)_2$. The reduction proceeded at pH 4.5. After the same work up as in Example 15, there was found to be 0.151 g precipitate and 41 ppm Cr in the filtrate. Thus, giving [(1008-41/1008×100] 95.9% removal of $Cr^{6+}$ showing no evidence for interference in $Cr^{6+}$ reduction by $Cu^{2+}$.

EXAMPLE 17

Sodium Bisulfite

The procedure of Example 16 was repeated except that 0.1072 g $Co(NO_3)_2$ was present during reduction. The other amounts used were 0.1498 g $K_2CrO_4$, 0.162 g $NaHSO_3$, and 0.053 g $Ca(OH)_2$ for adjustment for neutral pH. The reduction was at pH 5.2. After the same work up procedure as in Example 15, there was found to be 0.154 g precipitate and 81 ppm Cr in the filtrate. Thus, giving [(1004-81)/1004×100] 91.9% removal of $Cr^{6+}$ and showing no interference from $Co^{2+}$.

EXAMPLES 18–21

Sodium Bisulfite

Examples 18–21 are presented in tabular form.

EXAMPLES 18–21

| Ex. | Grams $K_2CrO_4$ | Grams Potentially Interferring Sub. | Grams $NaHSO_3$ | Reduction pH | wt. ppt (grams) | Cr in Filtrate (ppm) | % $Cr^{6+}$ Removed |
|---|---|---|---|---|---|---|---|
| 18 | 0.1501 | 0.0664 $MnSO_4$ | .1664 | 5.3 | 0.160 | 13 | 98.7 |
| 19 | 0.1514 | 0.0921 $ZnSO_4$ | .1724 | 5.2 | 0.140 | 73 | 92.8 |
| 20 | 0.1495 | 0.1318 $Ca(NO_3)_2$ | .1664 | 5.4 | 0.136 | 89 | 91.1 |
| 21 | 0.1536 | 0.1096 $Co(NO_3)_2$ | .1642 | 5.0 | 0.178 | 57 | 94.5 | pH neutralized with 0.0354, 0.0379, 0.0423, and 0.083 g $Ca(OH)_2$ in Examples 18, 19, 20, and 21, respectively. Total volume of solution was 40 ml in each case. The reduction reaction time was five minutes in each case.

We claim:

1. The process for removing heavy metal contaminants from an impure alkali metal nitrate containing them, said impure alkali metal nitrate being comprised of a mixture of between about 30 and 70 percent by weight of sodium nitrate and between about 30 and about 70 percent by weight of potassium nitrate, wherein said process comprises:
   a. admixing said impure alkali metal nitrate with sufficient water to form a concentrated aqueous solution thereof containing from between about 20 and about 70 percent by weight of alkali metal nitrate;
   b. adjusting the pH of said concentrated aqueous solution to within the range from between 2 and about 7;
   c. admixing sufficient reducing agent with said concentrated aqueous solution of alkali metal nitrate to provide at least the stoichiometric proportion necessary to react with heavy metal impurities contained therein, wherein said reducing agent is selected from the group consisting of alkali metal sulfide, alkali metal bisulfite, alkali metal borohydride, and hydrazine;
   d. admixing sufficient base with the aqueous alkali metal nitrate solution containing said reducing agent to raise the pH of the resulting mixture to above about 6, whereby a precipitate of solid heavy metal contaminants forms within said aqueous solution; and
   e. separating said solid heavy metal contaminants from the resulting purified aqueous solution of alkali metal nitrate.

2. The process of claim 1 wherein said reducing agent is sodium bisulfite.

3. The process of claim 1 wherein the pH of said concentrated aqueous solution of said alkali metal nitrate is adjusted with an acid selected from the group consisting of nitric acid, sulfuric acid, phosphoric acid, and hydrochloric acid.

4. The process of claim 3 wherein said acid is nitric acid.

5. The process of claim 4 wherein the pH of said aqueous solution is adjusted with a base selected from the group consisting of sodium hydroxide, potassium hydroxide, calcium hydroxide and calcium oxide.

6. The process of claim 5 wherein said base is sodium hydroxide.

7. The process of claim 1 wherein the temperature of said concentrated aqueous solution of alkali metal nitrate is maintained in the range between about 25° and about 85° C.

8. The process of claim 7 wherein said heavy metal impurities are selected from the group consisting of chromium, nickel, molybdenum, iron, and copper.

9. The process of claim 8 wherein said heavy metal impurity is chromium.

10. The process of claim 9 wherein the resulting purified aqueous solution of alkali metal nitrate is heated to effect evaporation of water therefrom and form a purified molten alkali metal nitrate.

11. The process of claim 10 wherein said purified molten alkali metal nitrate is granulated and cooled to form discrete solid particles of said alkali metal nitrate.

12. The process of claim 10 wherein said alkali metal nitrate is a mixture of sodium nitrate and potassium nitrate containing about 60 percent sodium nitrate and 40 percent potassium nitrate.

13. The process of claim 3 wherein said pH is adjusted to the range between about 2 and about 5.

14. The process of claim 5 wherein the pH is adjusted with said base to between about 7 and about 8.

* * * * *